Aug. 6, 1935. E. J. O'GORMAN 2,010,316
HEATING DEVICE
Filed July 5, 1933
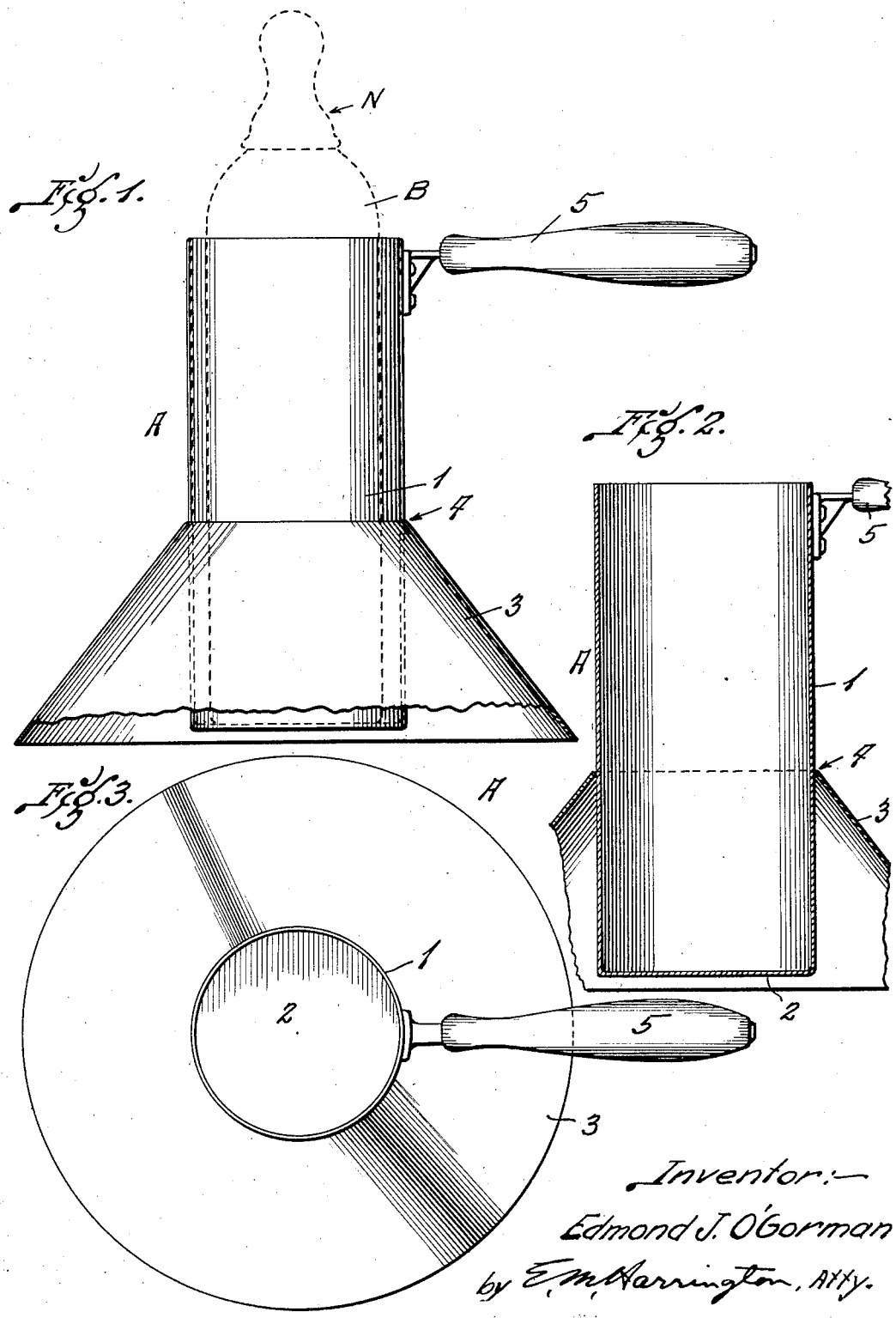
Inventor:—
Edmond J. O'Gorman
by E. M. Harrington, Atty.

Patented Aug. 6, 1935

2,010,316

UNITED STATES PATENT OFFICE 2,010,316

HEATING DEVICE

Edmond J. O'Gorman, Maplewood, Mo.

Application July 5, 1933, Serial No. 679,088

2 Claims. (Cl. 126—261)

This invention relates generally to heating devices, and more specifically to heating devices adapted particularly for use in heating the contents of nursing bottles and for heating various other articles with the aid of a gas or other flame, the predominant object of the invention being to provide a heating device of this type which is of extremely simple construction and which is capable of very efficiently performing its intended function.

Fig. 1 is an elevation of the improved heating device with a part thereof shown in section.

Fig. 2 is a fragmentary vertical section of the heating device shown in Fig. 1.

Fig. 3 is a plan view of the improved heating device illustrated in Figs. 1 and 2.

In the drawing, wherein is shown for the purpose of illustration, merely, one embodiment of the invention, A designates the improved heating device generally. The heating device A comprises a body portion 1 which preferably (though not necessarily) is of cylindrical shape, said body portion being elongated vertically and being open at its top. At the bottom of the body portion 1 same is closed by a bottom wall 2, as shown most clearly in Fig. 2. Associated with the body portion 1 is a hood 3, said hood being of outwardly and downwardly flared formation with its wider lower end located slightly below the bottom wall 2 of the body portion 1. The hood 3 is secured in any suitable manner, by means of solder, for instance, to the cylindrical wall of the body portion 1 at the point designated by the reference character 4, and the wider lower end of said hood is open, as shown most clearly in Fig. 1. The heating device A is provided with a suitable handle 5 to facilitate handling thereof, which handle may be secured thereto in any suitable manner; for instance, the handle 5 may be secured by rivets or otherwise to the body portion 1 adjacent to the top thereof and extend outwardly therefrom, as shown in Figs. 1 and 2.

In the use of the improved heating device, water is introduced into the body portion 1 of the device and the device is associated with a gas or other flame in such manner that the hood 3 surrounds the flame and the bottom wall 2 of the body portion is located immediately above said flame. A nursing bottle B, or other article to be heated, is then introduced into the body portion 1, and because the body portion is of greater diameter than a nursing bottle, or any other article which would be heated with the aid of the device, a wall of water will be present between the outer surface of the bottle or other article and the inner face of the cylindrical side wall of the body portion of the device. The heat of the flame beneath the device A will cause the water within the body portion to be heated, with the result that the nursing bottle or other article will be likewise heated.

It is important to note that the hood 3 serves to concentrate the heat rising from the flame beneath the device so that substantially all of said heat is directed against the lower wall portions of the body portion 1 of the heating device. In this manner an economy in fuel consumption is realized, and the time required for the heating operation is reduced. Also, the presence of the hood 3 prevents the heat from the flame from passing upwardly along the cylindrical side wall of the body portion 1 and burning or otherwise injuring the nipple N which is located at the top of the bottle B.

I claim:

1. A heating device for heating a nursing bottle of milk having a flexible nipple attached to the neck portion thereof, comprising a cylindrical container adapted to receive a body of water and a bottle to be heated, said container being of substantially constant diameter from top to bottom and being closed at the bottom by a wall and permanently open at the top, said bottle container being of only slightly greater diameter than a standard nursing bottle and being of such height that a standard nursing bottle heated therein will extend above the open top of the container so that the nipple at the top of the bottle is located some distance above the top of the container, a downwardly and outwardly flared imperforate hood secured to said container at a point above its closed lower end and extended to a point below the lower end thereof, said container being adapted to be heated by a heating flame located beneath same and said hood being adapted to concentrate the heat arising from said flame and direct said heat against the lower portion of the container while protecting the nipple at the top of the bottle from the heat of the heating flame, and a handle for facilitating handling of the heating device.

2. A heating device for heating a nursing bottle of milk having a flexible nipple attached to the neck portion thereof, comprising a cylindrical container adapted to receive a body of water and a bottle to be heated, said container being of substantially constant diameter from top to bottom and being closed at the bottom by a wall and permanently open at the top, said bottle container being of only slightly greater diameter than a standard nursing bottle and being of such height that a standard nursing bottle heated therein will extend above the open top of the container so that the nipple at the top of the bottle is located some distance above the top of the container, a downwardly and outwardly flared imperforate hood secured to said container at a point above its closed lower end and extended to a point below the lower end thereof, said container being adapted to be heated by a heating flame located beneath same and said hood being adapted to concentrate the heat arising from said flame and direct said heat against the lower portion of the container while protecting the nipple at the top of the bottle from the heat of the heating flame, and a handle located adjacent to the upper portion of the container for facilitating handling of the heating device.

EDMOND J. O'GORMAN.